United States Patent
DeWall

(10) Patent No.: US 6,452,097 B1
(45) Date of Patent: Sep. 17, 2002

(54) METHOD AND DEVICE FOR INSTALLING WALLBOARD OVER A PREVIOUSLY INSTALLED JUNCTION BOX

(76) Inventor: Harold O. DeWall, 1138 Lehner Ave., Escondido, CA (US) 92026

(*) Notice: Subject to any disclaimer, the term of this patent is extended or adjusted under 35 U.S.C. 154(b) by 0 days.

(21) Appl. No.: 09/865,885

(22) Filed: May 25, 2001

(51) Int. Cl.[7] .......................... H01H 13/04; G01B 1/00
(52) U.S. Cl. ..................... 174/58; 33/DIG. 10; 33/528; 220/3.3
(58) Field of Search .............................. 174/57, 53, 50, 174/54, 58; 220/3.7, 3.8, 241, 242, 3.3; 33/DIG. 10, 528

(56) References Cited

U.S. PATENT DOCUMENTS

| | | | | |
|---|---|---|---|---|
| 3,059,803 A | * | 10/1962 | Holsinger | 174/50 |
| 4,355,511 A | * | 10/1982 | Jones | 290/42 |
| 4,384,396 A | * | 5/1983 | Smolik | 33/DIG. 10 |
| 4,388,890 A | * | 6/1983 | Wester et al. | 33/DIG. 10 |
| 6,188,228 B1 | * | 2/2001 | Philipp | 324/642 |
| 6,229,294 B1 | * | 5/2001 | Wun | 324/228 |
| 6,301,997 B1 | * | 10/2001 | Welte | 33/263 |

OTHER PUBLICATIONS

Product Brochure for the ROTOZIP SPIRAL SAW of Roto Zip Tool Corporation of Cross Plains, Wisconsin entitled "Spiral Saw Quick Reference Guide;" published more than one year prior to May 25, 2001.

Owner's Manual for the ROTOZIP SPIRAL SAW of Roto Zip Tool Corporation of Cross Plains, Wisconsin, published more than one year prior to May 25, 2001.

* cited by examiner

*Primary Examiner*—Dean A. Reichard
*Assistant Examiner*—Angel R. Estrada
(74) *Attorney, Agent, or Firm*—Loyal McKinley Hanson

(57) ABSTRACT

A method for installing a sheet of wallboard over a previously installed junction box includes the steps of providing a magnet and a magnet-sensing device adapted to produce a human discernible signal when placed against an outwardly facing side of the sheet of wallboard in close proximity to the magnet. The method proceeds by mounting the magnet on the junction box, installing the sheet of wallboard over the junction box, searching for the junction box by moving the magnet-sensing device along the outwardly facing side of the sheet of wallboard until the sensor produces the human discernible signal, and then cutting an opening in the sheet of wallboard at the location of the junction box. A magnet-sensing device includes a housing supporting an electrical circuit that is adapted to produce a human discernible signal when placed in close proximity to a magnet located behind the wallboard. One such device includes a light-emitting diode and magnetically actuated switch, and it is adapted to be mounted on a routing tool in a position enabling a user to search for the magnet with the magnet-sensing device while holding the routing tool in a ready position such that the routing tool is in position to cut a hole in the wallboard when the junction box is located.

3 Claims, 3 Drawing Sheets

METHOD AND DEVICE FOR INSTALLING WALLBOARD OVER A PREVIOUSLY INSTALLED JUNCTION BOX

BACKGROUND OF THE INVENTION

1. Technical Field

This invention relates generally to building construction equipment and techniques. It relates more particularly to a method and device for installing drywall or other wallboard over an electrical outlet box or other previously installed junction box.

2. Description of Related Art

The term "wallboard" herein refers to gypsum wallboard ("drywall"), plywood, and any of various other types of sheet material used to cover the wall studs or other framework of a building. The term "junction box" herein refers to any of various types of components mounted on the wall studs or other framework of the building as part of the installation of fixtures or other components on the outwardly facing side of the wallboard (i.e., the side facing away from the framework). Examples of such fixtures or other components include electrical outlets, lighting fixtures, heating and air conditioning components, speaker outlets, home security outlets, ceiling fans, plumbing components, and the like. The junction boxes are usually installed first. Another crew then adds the wallboard over them and this is where some concerns arise.

Consider, for example, the task of installing drywall on the wall studs of a new building under construction over previously installed junction boxes in the form of electrical outlet boxes. This is usually done by drywallers after the electrical outlet boxes are already in place. The outlet boxes have previously been nailed, screwed, or otherwise suitably mounted on the wall studs, and an electrician has already strung wiring to them. Each outlet box provides a physical support on which to mount an electrical fixture (e.g., an electrical outlet, switch, lighting fixture, or the like.) It also serves as a terminal structure to which to string wiring to be electrically connected to the fixture, and as a protective enclosure for the electrical connection.

The drywallers proceed by nailing or screwing sheets of drywall to the studs right over the electrical outlet boxes. The outlet boxes usually extend outwardly from the studs the thickness of the drywall (e.g., ⅝") and so the drywall is initially nailed or screwed to the studs loosely, bowed somewhat to accommodate the protruding outlet boxes. Next, the drywallers locate the outlet boxes and cut holes or openings in the drywall at each outlet box location so that the outlet boxes protrude into the holes and the drywall lies flat against the studs. Then, they add more nails or screws and proceed to tape the drywall and so forth to finish the installation.

The task of locating the electrical outlet boxes and cutting the holes is usually accomplished by measuring the location of each outlet box relative to the floor or ceiling, and then using those measurements to determine the right hole locations in the drywall (i.e., cutout locations). The drywallers use a router tool to form a hole (i.e., a cutout) at each cutout location so that the electrical outlet box protrudes into the cutout and the drywall lies flat against the studs. Then, they complete the nailing or screwing of the drywall to the studs. This time-consuming procedure also applies for cutouts for other types of junction boxes. It is especially costly using high-skilled drywallers. Thus, there is a need for a better way to install drywall and other wallboard over previously installed junction boxes . . . a better way to locate electrical outlet boxes and other previously installed junction boxes behind the wallboard in order to form the required cutouts.

SUMMARY OF THE INVENTION

This invention addresses the concerns outlined above by mounting a magnet on the junction box before installing a sheet of wallboard over it, and then searching for the magnet on the junction box with a magnet-sensing device after the sheet of wallboard is installed. Thus, there are no-time consuming measurements to make nor the potential of associated errors. And, the method and device of the invention are suited for all types of junction boxes.

To paraphrase some of the more precise language appearing in the claims, a method for installing a sheet of wallboard over a previously installed junction box includes the steps of providing a magnet and a magnet-sensing device. The magnet-sensing device is adapted to produce a human discernible signal when placed against an outwardly facing side of the sheet of wallboard in close proximity to the magnet, with the magnet located next to an opposite inwardly facing side of the sheet of wallboard. The magnet-sensing device may, for example, take the form of a battery-powered circuit having a magnetically actuated switch that turns a light-emitting diode (LED) on when close to the magnet.

The method proceeds by (i) mounting the magnet on the junction box, (ii) installing the sheet of wallboard over the junction box so that the inwardly facing side of the sheet of wallboard faces the junction box, (iii) searching for the junction box by moving the magnet-sensing device along the outwardly facing side of the sheet of wallboard until the sensor produces the human discernible signal, and (iv) cutting an opening in the sheet of wallboard at the location of the junction box indicated by the magnet-sensing device. Any of various means for mounting the magnet may be employed, including a roll of magnet-mounting tape having a plurality of magnets at uniformly space-apart intervals on a length of adhesive tape such that a user can tear off a piece of the tape with one magnet and stick it onto the junction box.

In line with the foregoing, there is provided a magnet-sensing device having a housing and an electrical circuit on the housing. The electrical circuit is adapted to produce a human discernible signal when placed against the outwardly facing side of the sheet of wallboard in close proximity to the magnet, with the magnet on the junction box next to an opposite inwardly facing side of the sheet of wallboard. One preferred embodiment is adapted to be mounted on a routing tool in order to enable a user to search for the junction box with the magnet-sensing device while holding the routing tool in a ready position such that the routing tool is in position to cut the hole when the junction box is located.

Thus, the method and device of this invention significantly facilitates wallboard installation, whether the wallboard cutout is for an electrical outlet box or for some other form of junction box. The following illustrative drawings and detailed description make the foregoing and other objects, features, and advantages of the invention more apparent.

DESCRIPTION OF THE PREFERRED EMBODIMENTS

FIGS. 1–7 of the drawings show various aspects of a method and device for Installing drywall or other wallboard according to the invention over an electrical outlet box or other previously installed junction box. First consider FIGS. 1 and 2. They show a sheet of drywall 10 (e.g., ⅝-inch thick) that a drywall crew installed over a previously installed electrical outlet box 11 (e.g., 4 inches high and 2-⅛ inches wide). Before installing the sheet of drywall 10, however, one of the drywall crew (not shown) mounted a magnet 12 on the electrical outlet box 11 using a plate 13 of steel or other magnetic material that is shaped and dimensioned to engage the outlet box 11 with a press fit. Then, the drywall crew installed the sheet of drywall 10 over the outlet box 11, with an outwardly facing side 10A of the sheet of drywall 10 facing away from the junction box 11 and an opposite inwardly facing side 10B of the sheet of drywall 10 facing toward the junction box 11.

Figure 1:
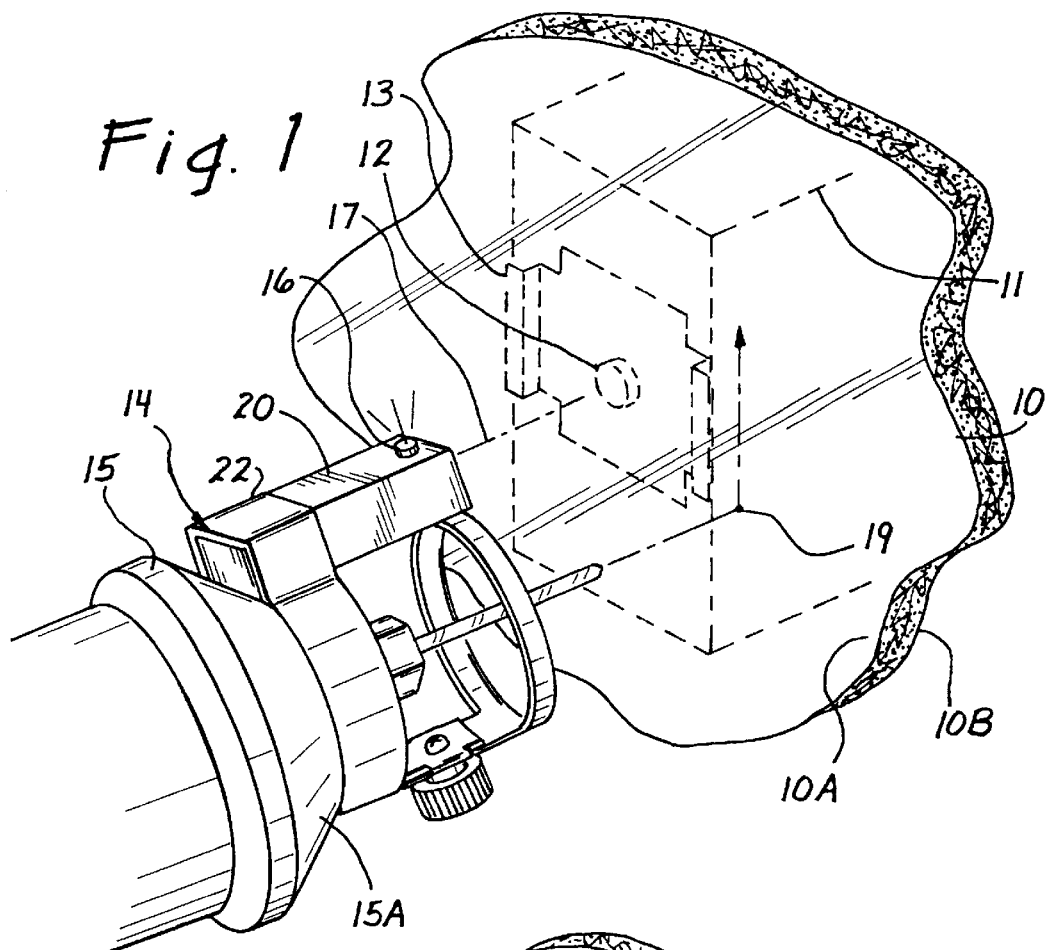
FIG. 1 of the drawings is an isometric view of a magnet-sensing device constructed according to the invention that is mounted on a conventional router tool as it is being used according to the method of the invention to locate a magnet on an electrical outlet box in order to locate the outlet box and thereby the position at which to form a wallboard cutout.

The foregoing places the magnet 12 next to the inwardly facing side 10B of the sheet of drywall 10, and one of the drywall crew proceeds to search for it, and thereby junction box 11, using a magnet-sensing device 14 that is mounted on a routing tool 15 (FIG. 1). Any of various magnets may be used that have a magnetic field sufficient to actuate the magnet-sensing device 14 through the drywall 10, the illustrated magnet 12 being about one-half inch in diameter. As the drywall crew member moves the magnet-sensing device 14 along the outwardly facing side 10A of the sheet of drywall 10, the magnet-sensing device 14 eventually comes to a position in close proximity to the magnet 12 (i.e., within about one inch or so of the magnet 12). The magnet-sensing device 14 then emits a human discernible signal from an LED 16. A dashed line 17 in FIG. 1 depicts the magnetic coupling between the magnet 12 and the magnet-sensing device 14.

Figure 2:
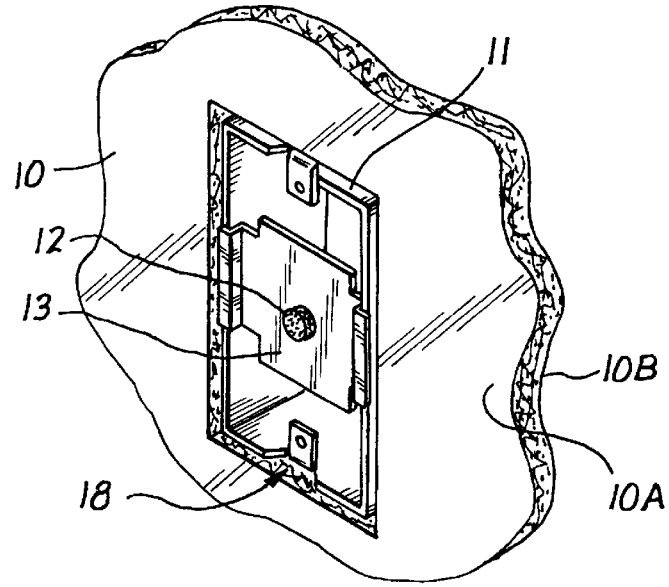
FIG. 2 is a reduced isometric view of the wallboard and outlet box after the wallboard cutout has been made.

Having located the magnet 12 as described above, and thereby the outlet box 14, the drywall crew member proceeds to operate the routing tool 15 in a known way (as depicted by dashed lines at reference numeral 19 in FIG. 1), in order to thereby cut an opening or cutout 18 (FIG. 2) in the sheet of drywall 10. The cutout 18 is a rectangularly shaped opening slightly larger than the outside dimensions of the outlet box 11 so that the outlet box 11 then protrudes into the cutout 18 as shown in FIG. 2. That allows the sheet of drywall 10 to rest flat against the wall studs or other building framework (not shown) onto which the outlet box 11 and the sheet of drywall 10 are nailed or screwed.

Recapitulating the methodology employed, a method invention for installing a sheet of wallboard according to the invention over a previously installed junction box, includes the steps of providing a magnet and a magnet-sensing device adapted to produce a human discernible signal when placed against an outwardly facing side of the sheet of wallboard in close proximity to the magnet with the magnet located next to an opposite inwardly facing side of the sheet of wallboard. The method proceeds by (i) mounting the magnet on the junction box, (ii) installing the sheet of wallboard over the junction box so that the inwardly facing side of the sheet of wallboard faces the junction box, (iii) searching for the junction box by moving the magnet-sensing device along the outwardly facing side of the sheet of wallboard until the magnet-sensing device produces the human discernible signal, and (iv) cutting an opening in the sheet of wallboard at the location of the junction box indicated by the magnet-sensing device.

Figure 3:
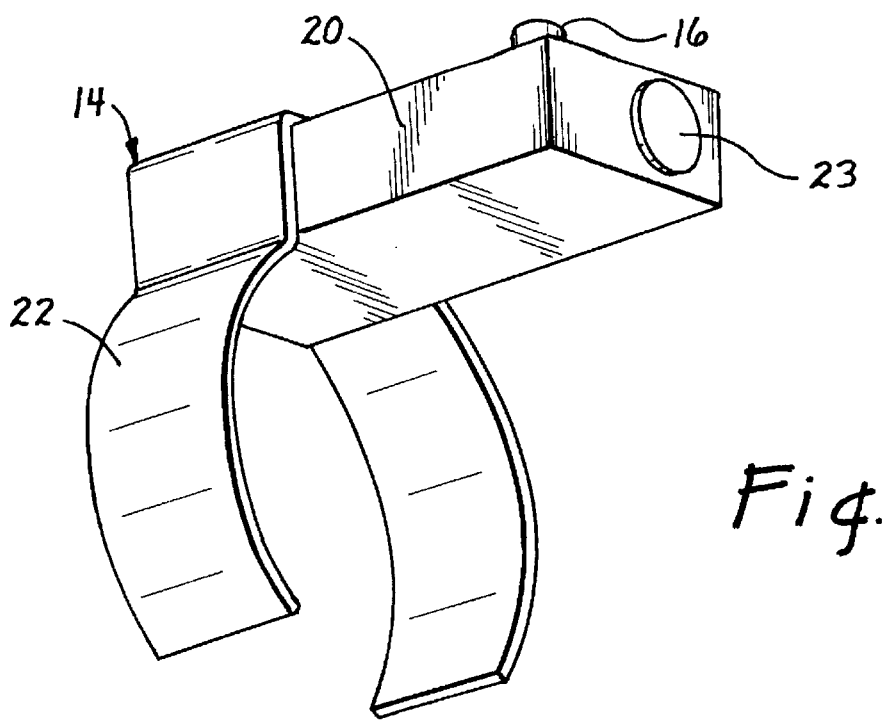
FIG. 3 is an enlarged isometric view of just the magnet-sensing device.
Figure 4:
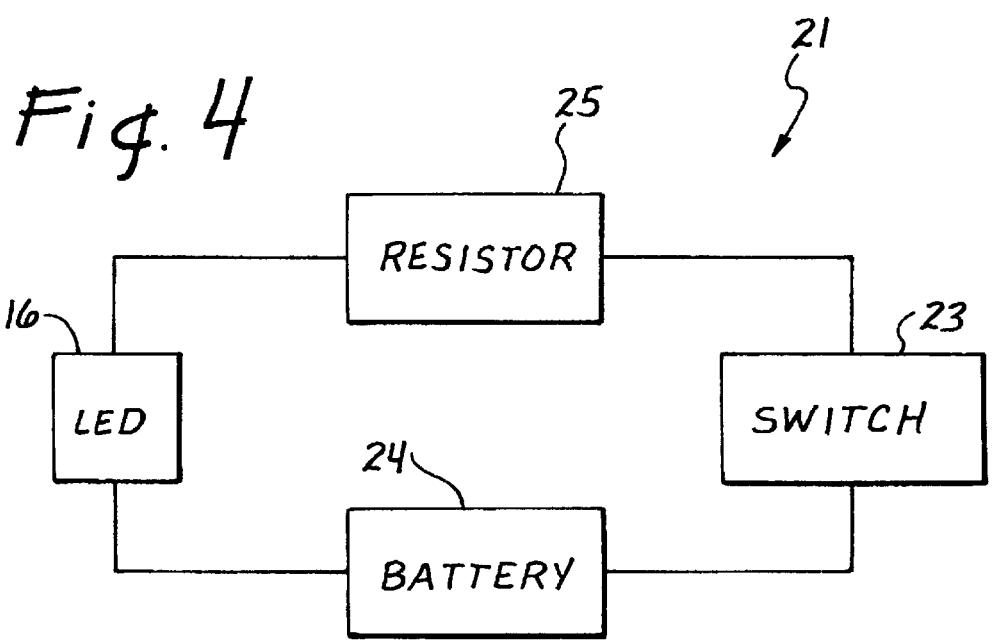
FIG. 4 is a block circuit schematic of the circuitry of the magnet-sensing device.

FIGS. 3 and 4 show further particulars of the magnet-sensing device 14. It includes a housing 20 (FIGS. 1 and 3) that supports an electrical circuit 21 shown in FIG. 4. The housing 20 is composed of plastic or other suitably rigid material. As an idea of size, it measures about 2.0 inches by 1.25 inches by 0.5 inches. Of course, those dimensions may vary without departing from the scope of the claims. The magnet-sensing device 14 also includes a strap 22 attached to the housing 20 (FIGS. 1 and 3). The strap 22 is composed of spring steel, plastic, or other resiliently deformable material, and it functions as means for mounting the housing 20 on the routing tool 15. The strap 22 holds the housing 20 on the routing tool 15 in a position enabling the drywall crew member or other user to search for the magnet 12 on the outlet box 11 with the device 14 while holding the routing tool 15 in a ready position such that the routing tool 15 is in position to cut the cutout 18 in the sheet of drywall 10 when the outlet box 11 is located.

Other mounting means may be employed to serve this function within the scope of the claims. The illustrated strap 22 fits on a circularly shaped forward end portion 15A of the routing tool 15 as shown in FIG. 1. The illustrated routing tool 15 represents any of various commercially available routing tools, including the spiral saws available from Roto Zip Tool Corporation of Cross Plains, Wis. The circuit 21 includes a commercially available magnetically actuated switch 23 (FIGS. 3 and 4) that couples battery power from a battery 24 (FIG. 4) through a current limiting resistor 25 to the LED 16 when actuated by being in close proximity to the magnet 12. Of course, other magnet-sensing circuits producing different human sensible signals (e.g., sound) may be employed within the scope of the claims and without departing from the inventive concepts disclosed. Based upon the foregoing description and the drawings, one of ordinary skill in the art can readily implement a magnet-sensing device according to the invention.

Figure 5:
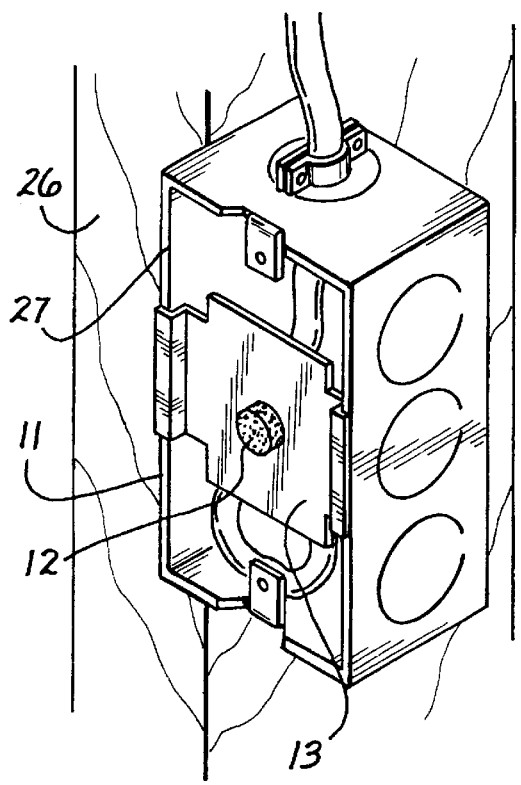
FIG. 5 is an isometric view of a first magnet-mounting arrangement that includes a magnet on a plate that is shaped and dimensioned to engage the the outlet box with a press fit.

FIG. 5 is an enlarged perspective of the junction box 11 with the magnet 12 mounted on it by means of the plate 13. The junction box 11 is nailed or screwed to a wall stud 26 so that a forward edge 27 of the junction box 11 extends beyond the wall stud 26 a distance approximately equal to the thickness of the drywall 10 (e.g., ⅝ of an inch).

Figure 6:
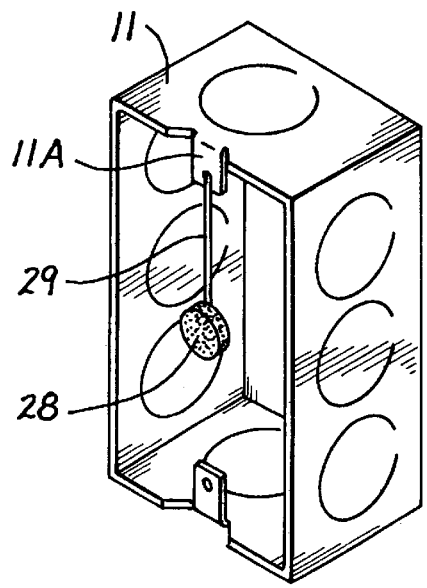
FIG. 6 is an isometric view of a second magnet-mounting arrangement that includes a magnet on a wire that is used to hook the magnet onto the outlet box.
Figure 7:
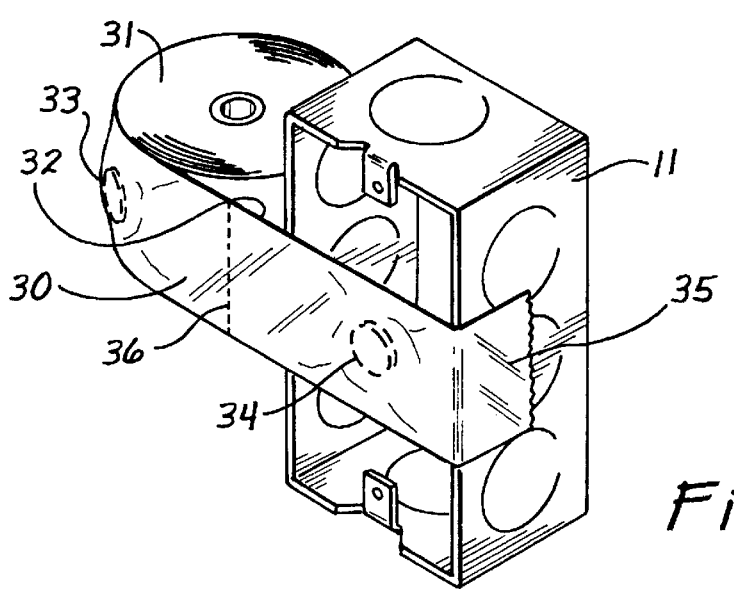
FIG. 7 is an isometric view of a third magnet-mounting arrangement that includes multiple magnets on a roll of adhesive tape such that a user can tear off a piece of tape with one magnet on it in order to tape one magnet onto the outlet box.

Other magnet mounting means may be employed. FIG. 6 illustrates a magnet 28 with an attached wire 29 that engages a tab 11A on the junction box 11 in order to mount the magnet 28 on the junction box 11. FIG. 7 shows yet another magnet mounting means in the form of a length of tape 30 that is disposed in a roll 31. The length of tape 30 has a side 32 that is adapted to adhesively stick onto the junction box 11. The length of tape 30 includes a plurality of magnets on the length of tape (just two magnets 33 and 34 being illustrated in FIG. 7) that are disposed at uniformly space-apart intervals (e.g., 4 inches apart) on the length of tape 30. A user tears off a 4-inch piece 35 of the length of tape 30 with one magnet (e.g., the magnet 34) in order to stick the piece 35 onto the junction box 11 and thereby mount the magnet 34 on the junction box 11. The piece 35 is not shown torn off from the rest of the length of tape 30 for illustrative convenience in order to show the relationship before it is torn off. Perforations in the length of tape 30 midway between the magnets (such as a perforation 36 midway between the magnets 33 and 34) facilitate tearing off of pieces of tape from the length of tape 30. Based upon the foregoing description and the drawings, one of ordinary skill can readily implement a roll or magnet-mounting tape according to the invention.

Thus, the method and device of the invention greatly facilitates wallboard installation. There are no-time consuming measurements to make nor the potential of associated errors, and the method and device of the invention are suited for all types of junction boxes. Although exemplary embodiments have been shown and described, one of ordinary skill in the art may make many changes, modifications, and substitutions without necessarily departing from the spirit and scope of the invention. For example, the manufacturer of the junction box could provide a junction box with a magnet already installed on or in it. The illustrated junction boxes are intended to illustrate that variation and such an arrangement is intended to fall within the scope of the claims. As another example, the magnet-sensing device 14 can be spring loaded so that is retractable, reaching to the end of the router bit and retracting when it abuts the drywall. That arrangement is intended to fall within the scope of the claims also.

What is claimed is:

1. A device for locating a previously installed junction box after a sheet of wallboard has been installed over the junction box by searching for a magnet on the junction box, the device comprising:

a housing; and an electrical circuit on the housing that is adapted to produce a human discernible signal when placed against an outwardly facing side of the sheet of wallboard in close proximity to the magnet with the magnet on the junction box next to an opposite inwardly facing side of the sheet of wallboard.

2. A device as recited in claim 1, further comprising means for mounting the housing on a routing tool in a position on the routing tool enabling a user to search for the magnet on the junction box with the device while holding the routing tool in a ready position such that the routing tool is in position to cut an opening in the wallboard when the junction box is located.

3. A device as recited in claim 1, wherein the electrical circuit includes a light-emitting diode, a battery, and a magnetically actuated switch that couples electric power from the battery to the light-emitting diode.

* * * * *